United States Patent Office.

PIERRE JOSEPH BADOUX, OF NEW YORK, N. Y.

Letters Patent No. 68,028, dated August 27, 1867.

---

IMPROVED COMPOUND FOR PURIFYING SPIRITS AND OTHER LIQUIDS.

---

The Schedule referred to in these Letters Patent and making part of the same.

---

TO ALL WHOM IT MAY CONCERN:

Be it known that I, PIERRE JOSEPH BADOUX, in the county and State of New York, have invented a new and improved Chemical Mixture for the Purification and Discoloration of all Fluids and Spirits; and I do hereby declare that the following is a full and exact description thereof.

The extraordinary power from the above-said chemical mixture for all fluids and spirits to purify and to decolorize, results from the perfect and complete union of the several ingredients together in a variable dose or quantity.

I bring in a great barrel first one hundred pounds of quicklime with about one hundred pounds of water, and after having well mixed all together, I add fifty pounds of flowers of sulphur, well mixed with fifty pounds of water, and if all is well mixed I add one hundred pounds of sulphate of zinc or sulphate of iron, or sulphate of bismuth, or of alumina mixed with about one hundred pounds of water, and finally I add to the whole composition one hundred pounds sulphate of baryta. When this mixture by addition of water becomes strong alkaline, and marks about 40° (areometer Baumé) it is very useful for the purification and discoloration of all fluid, with the express condition that it should be saturated or neutralized by any acids, nitric, sulphuric, or muriatic. It is best to use the compound warm.

Having described my invention, what I claim, and desire to secure by Letters Patent, is—

1. The composition herein described for purifying and discoloring spirits and other liquids, substantially as described.

2. The combination of sulphur, lime, sulphate of zinc or iron, sulphate of baryta, and any acid or acids, as nitric, muriatic, or their mixture.

3. The combination of bisulphate of lime, sulphate of zinc, and sulphate of bismuth or iron, for the purification of spirits.

PIERRE JOSEPH BADOUX.

Witnesses:
CHARLES WALTER,
JAMES McKENNA.